Figure 1:
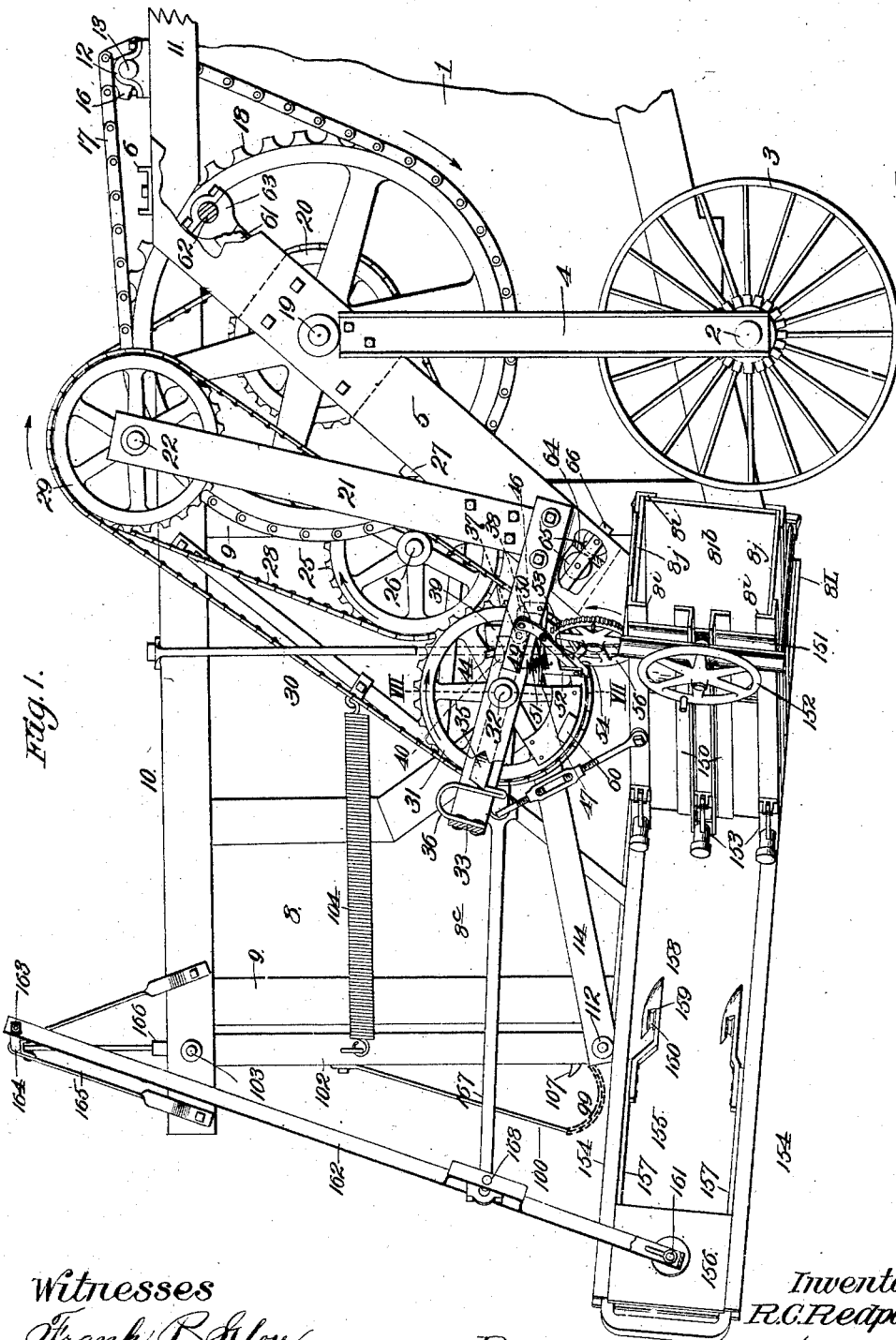

No. 868,886. PATENTED OCT. 22, 1907.
R. C. REDPATH.
BALING ATTACHMENT FOR THRESHING MACHINES.
APPLICATION FILED NOV. 21, 1905.

9 SHEETS—SHEET 1.

Witnesses
Frank P. Glou
H. C. Rodgers

Inventor
R. C. Redpath
By George H. Loyd
atty.

No. 868,886. PATENTED OCT. 22, 1907.
R. C. REDPATH.
BALING ATTACHMENT FOR THRESHING MACHINES.
APPLICATION FILED NOV. 21, 1905.
9 SHEETS—SHEET 2.
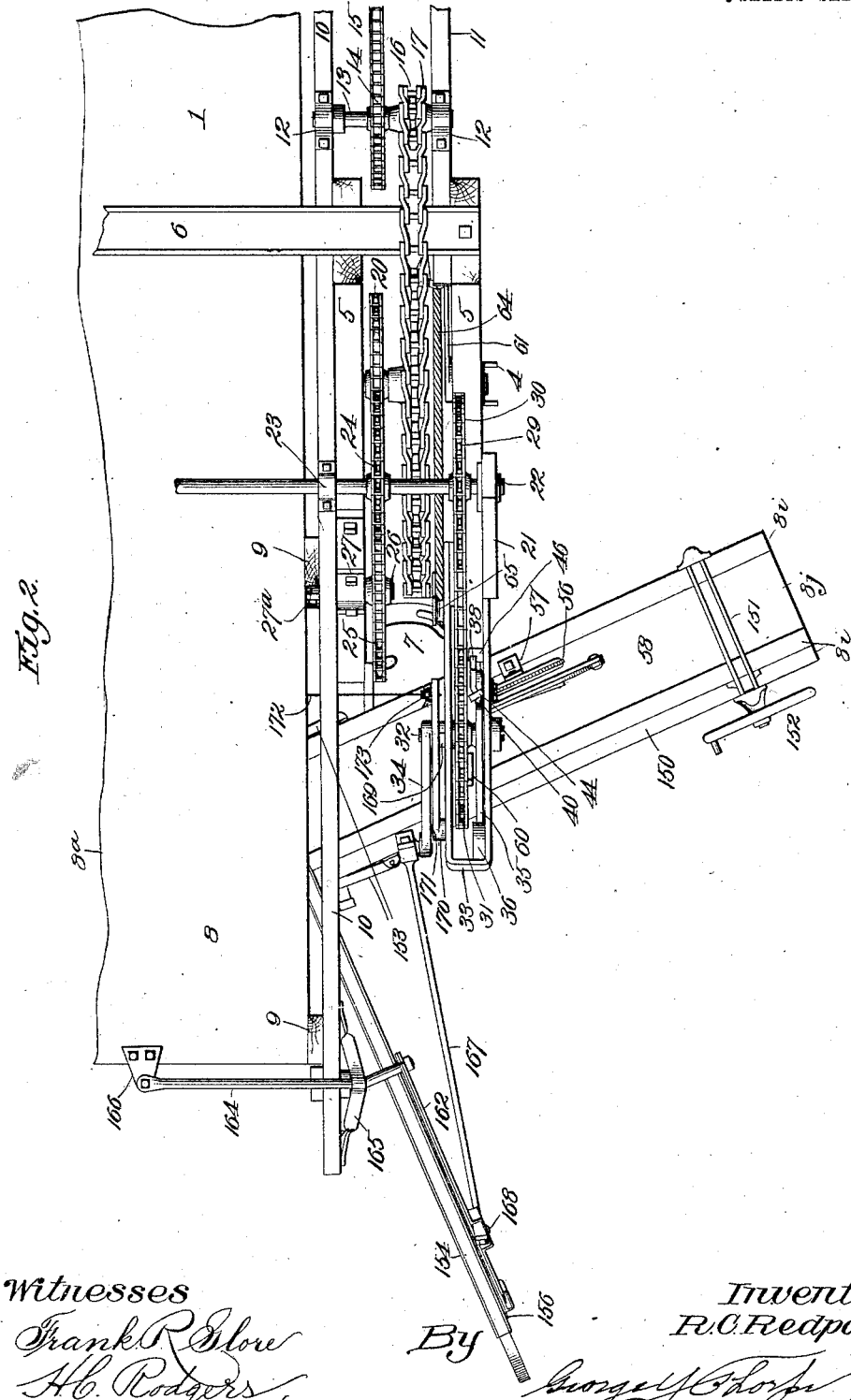
Witnesses
Frank R. Slow
H. C. Rodgers
Inventor
R. C. Redpath
By George L. Thorp atty.

No. 868,886. PATENTED OCT. 22, 1907.
R. C. REDPATH.
BALING ATTACHMENT FOR THRESHING MACHINES.
APPLICATION FILED NOV. 21, 1905.
9 SHEETS—SHEET 3.
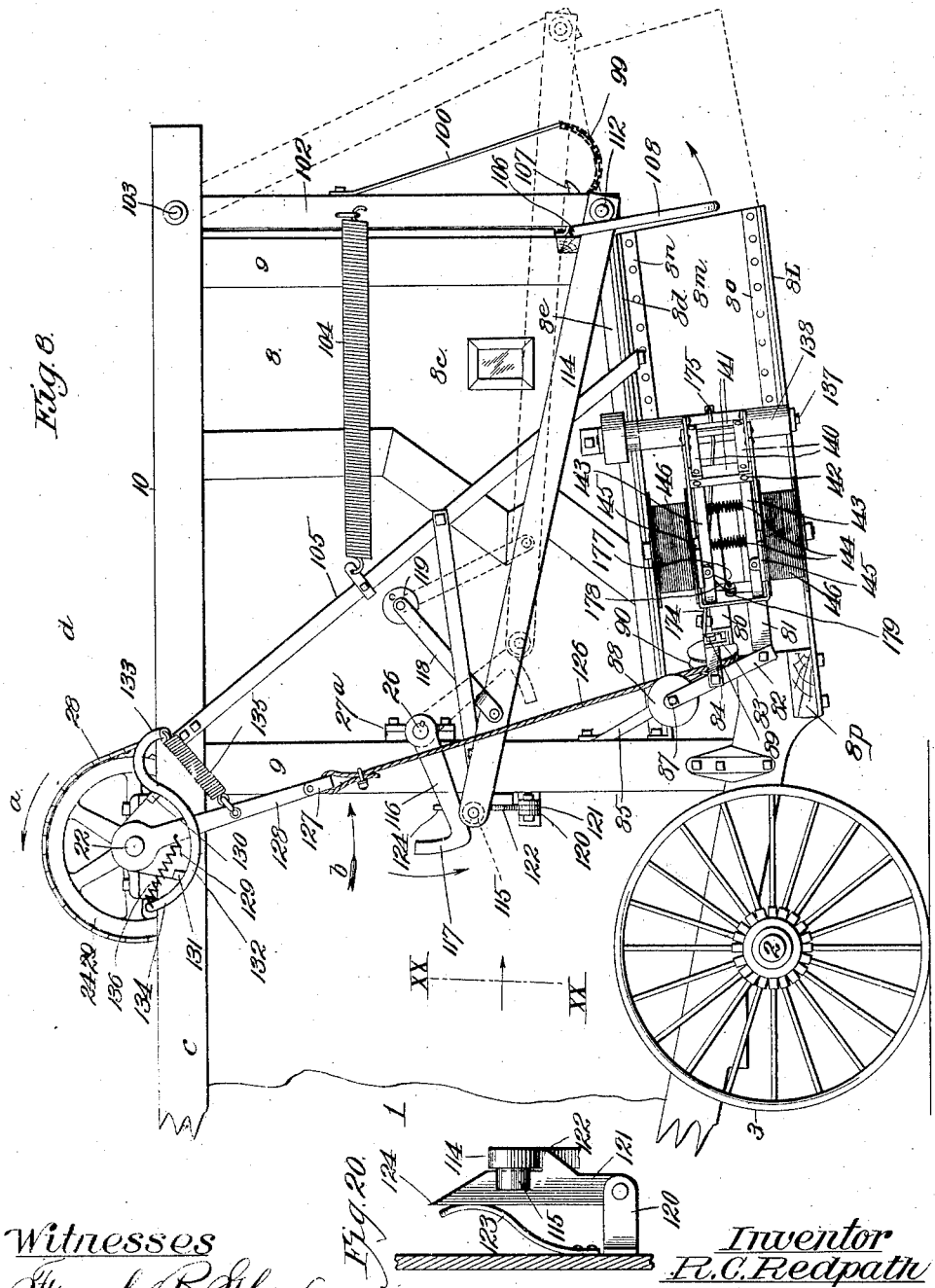
Witnesses
Frank R. Glow
H. C. Rodgers
Inventor
R. C. Redpath
By George J. Thorpe atty.

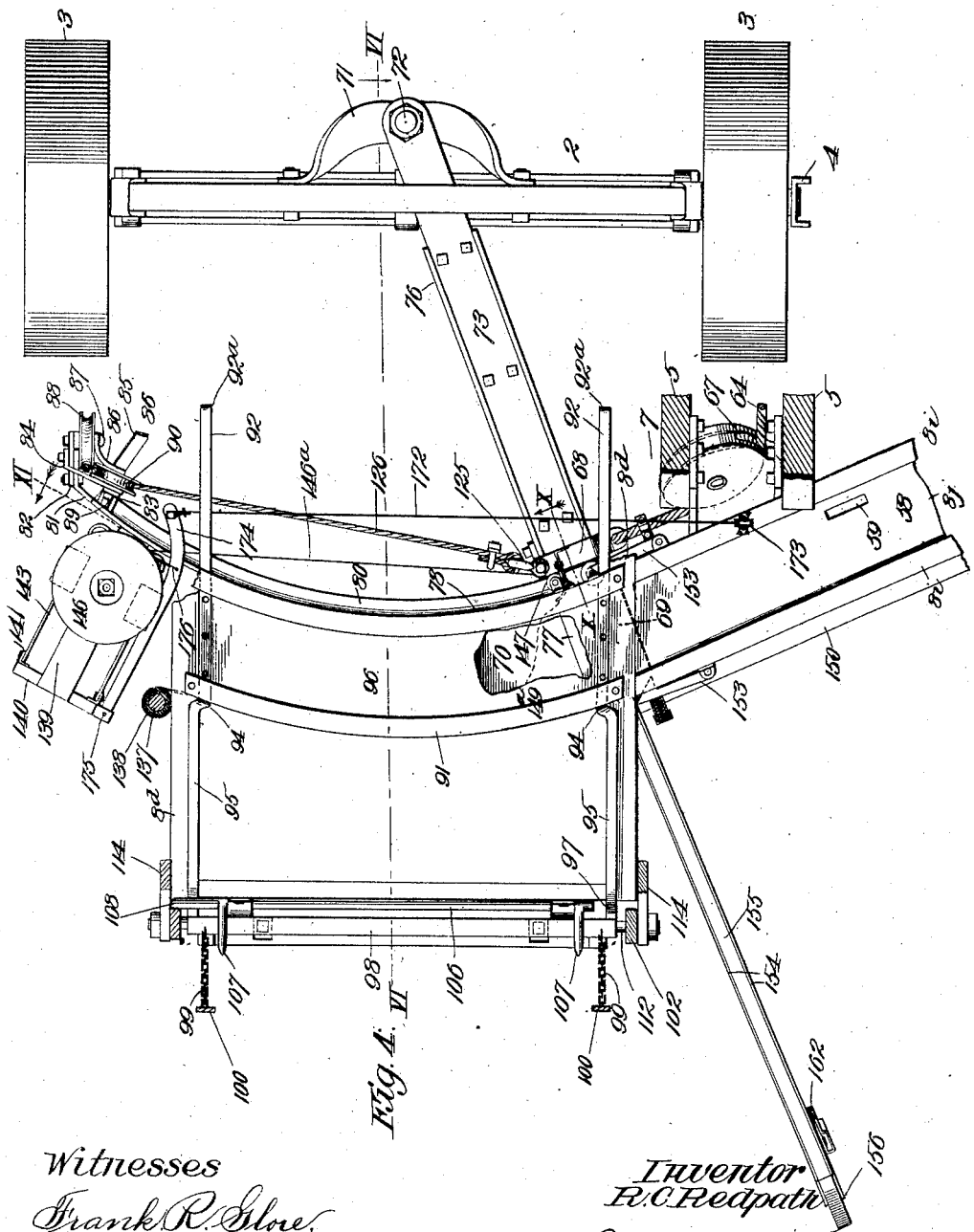

No. 868,886. PATENTED OCT. 22, 1907.
R. C. REDPATH.
BALING ATTACHMENT FOR THRESHING MACHINES.
APPLICATION FILED NOV. 21, 1905.
9 SHEETS—SHEET 5.
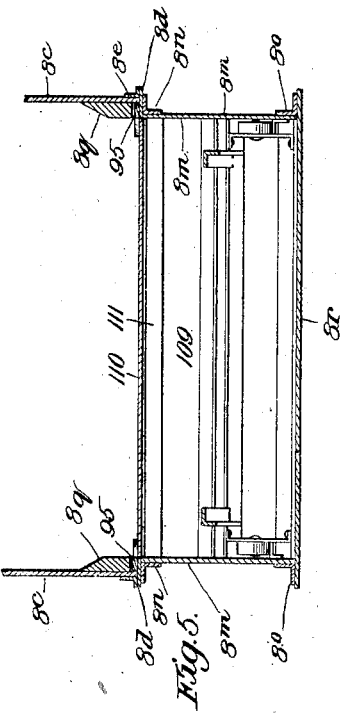
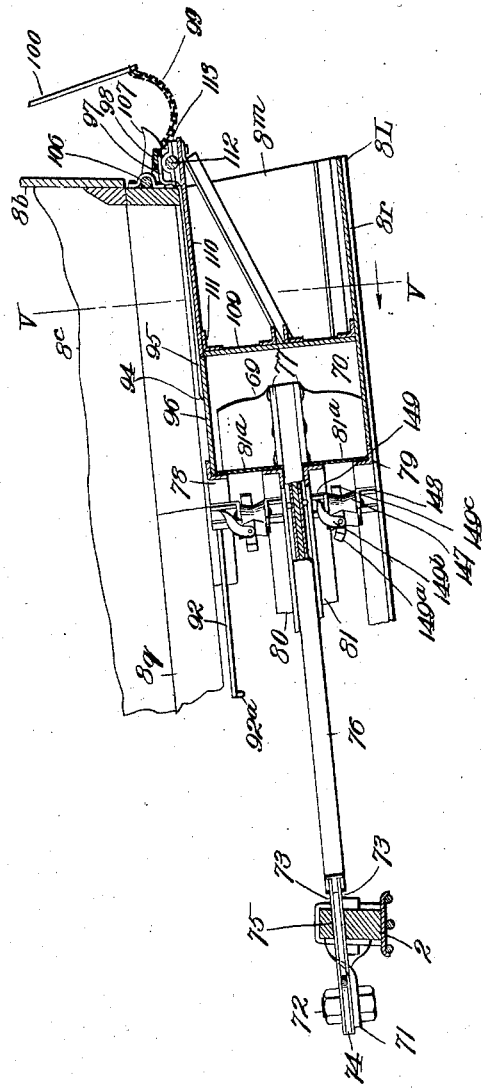
Witnesses
Frank R. Glou.
H. C. Rodgers
Inventor
R. C. Redpath
By George Y. Thorpe
atty.

No. 868,886. PATENTED OCT. 22, 1907.
R. C. REDPATH.
BALING ATTACHMENT FOR THRESHING MACHINES.
APPLICATION FILED NOV. 21, 1905.
9 SHEETS—SHEET 6.
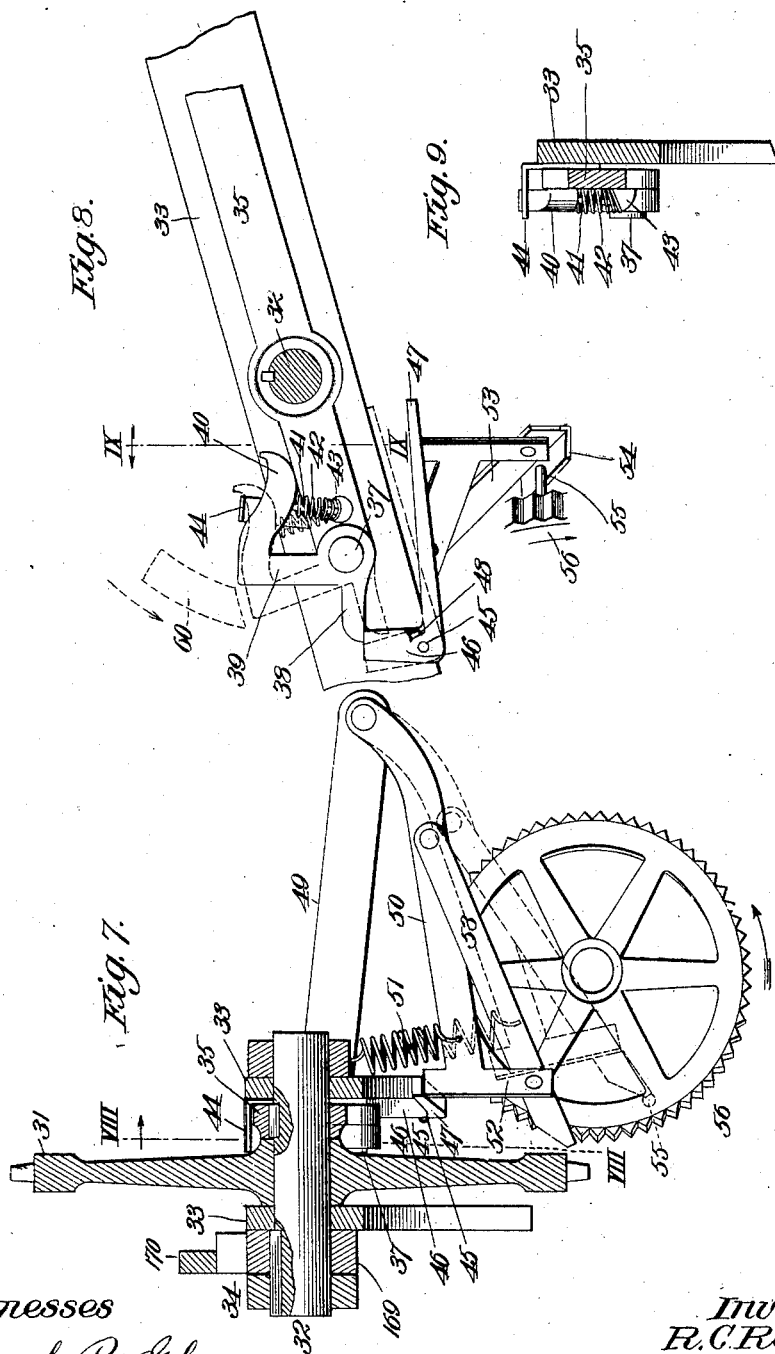
Witnesses
Frank R. Glore
H. C. Rodgers
Inventor
R. C. Redpath
By George H. Loofn
Atty.

No. 868,886. PATENTED OCT. 22, 1907.
R. C. REDPATH.
BALING ATTACHMENT FOR THRESHING MACHINES.
APPLICATION FILED NOV. 21, 1905.
9 SHEETS—SHEET 7.
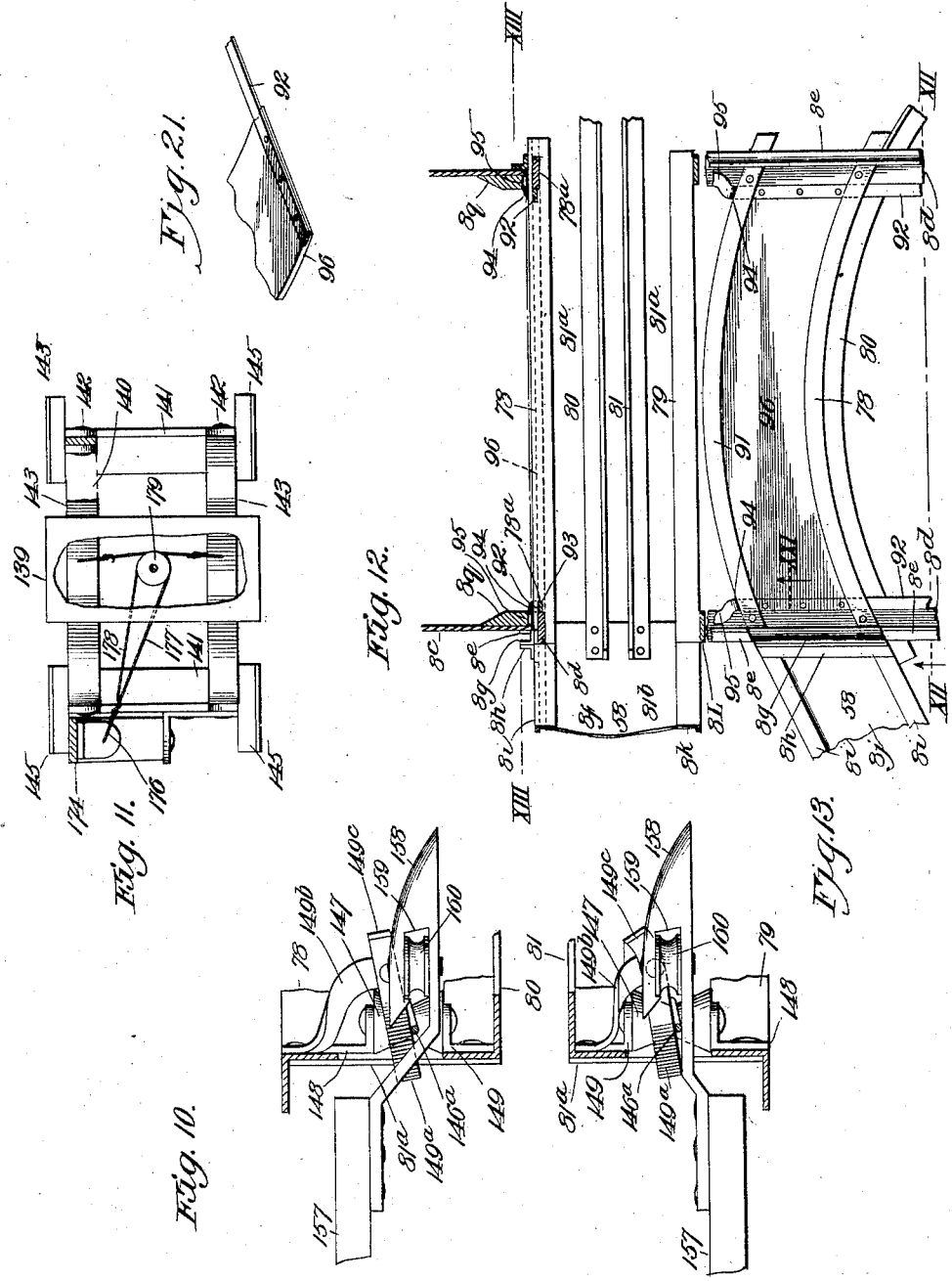

No. 868,886. PATENTED OCT. 22, 1907.
R. C. REDPATH.
BALING ATTACHMENT FOR THRESHING MACHINES.
APPLICATION FILED NOV. 21, 1905.
9 SHEETS—SHEET 8.
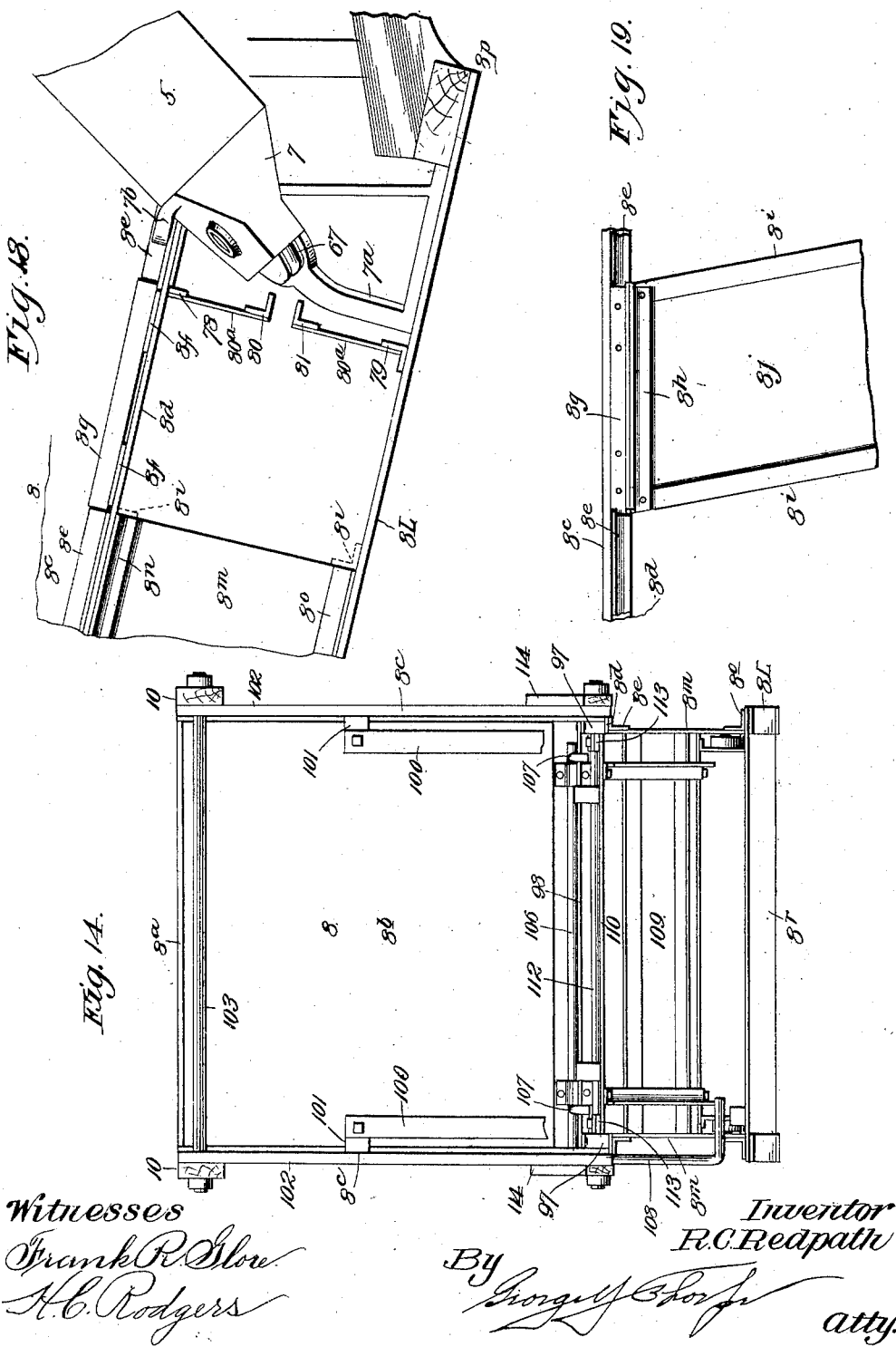
Witnesses
Frank R. Blow
H. C. Rodgers
Inventor
R. C. Redpath
By George W. Blow Jr.
atty.

No. 868,886. PATENTED OCT. 22, 1907.
R. C. REDPATH.
BALING ATTACHMENT FOR THRESHING MACHINES.
APPLICATION FILED NOV. 21, 1905.
9 SHEETS—SHEET 9.
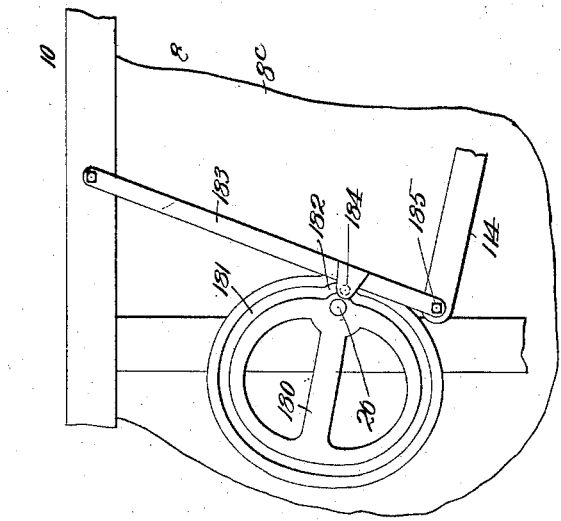
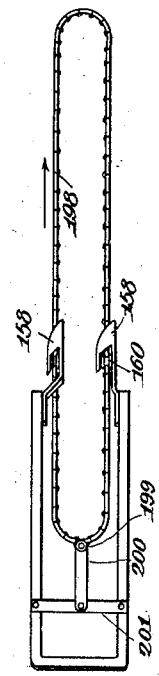
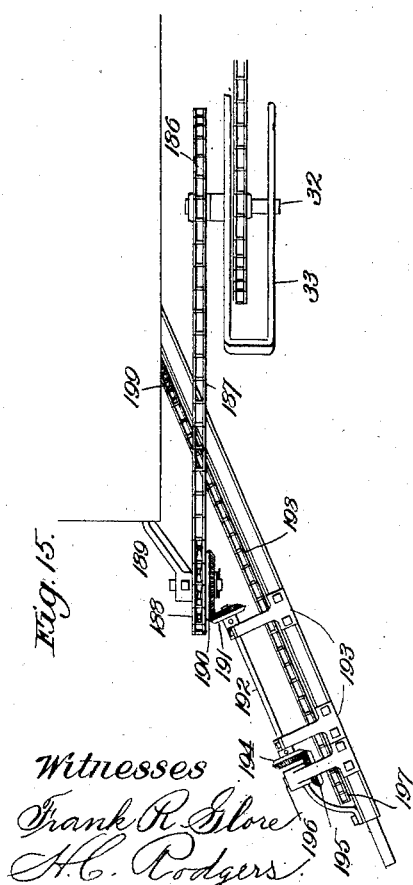
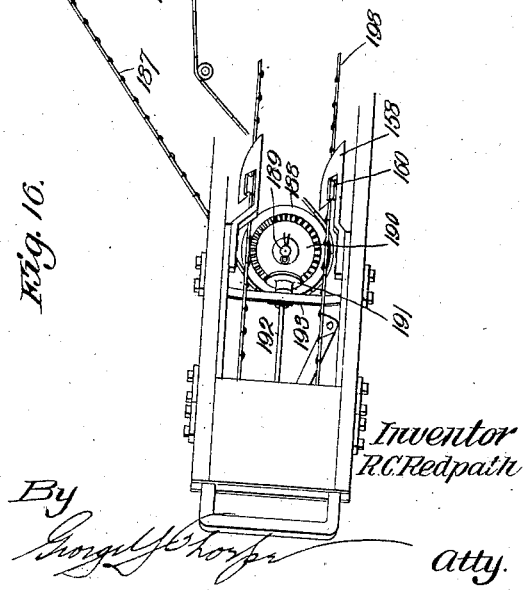
Witnesses
Frank R. Glore
H. C. Rodgers
Inventor
R. C. Redpath
By
George L. Thorpe
atty.

UNITED STATES PATENT OFFICE.

ROBERT C. REDPATH, OF JOHNSON COUNTY, KANSAS.

BALING ATTACHMENT FOR THRESHING-MACHINES.

No. 868,886.   Specification of Letters Patent.   Patented Oct. 22, 1907.

Application filed November 21, 1905. Serial No. 288,385.

*To all whom it may concern:*

Be it known that I, ROBERT C. REDPATH, a citizen of the United States, residing in the county of Johnson and State of Kansas, have invented certain new and useful Improvements in Baling Attachments for Threshing-Machines, of which the following is a specification.

This invention relates to baling attachments for threshing machines, and is designed more especially as an improvement on the similar machine on which I filed application for patent May 11, 1904, Ser. No. 207,487, my object in this connection being to produce a thoroughly efficient and reliable machine of this character.

To this end the invention consists in certain novel and peculiar features of construction and combinations of parts as hereinafter described and claimed; and in order that it may be fully understood reference is to be had to the accompanying drawings, in which—

Figure 1, is a side elevation of a portion of a threshing machine equipped with a baling attachment embodying my invention. Fig. 2, is a top plan view of the same. Fig. 3, is a view of the side of the machine opposite to that shown in Fig. 1. Fig. 4, is a horizontal section of the box or receptacle taken in the plane of the upper side of the baling case thereof; said figure also showing the rear axle and wheels of the threshing machine, with certain inclined parts in section above the plane of said baling case. Fig. 5, is a cross section taken on the line V—V of Fig. 6. Fig. 6, is a vertical section on the line VI—VI of Fig. 4. Fig. 7, is an enlarged section taken on the line VII—VII of Fig. 1. Fig. 8, is a section taken on the line VIII—VIII of Fig. 7. Fig. 9, is a section taken on the line IX—IX of Fig. 8. Fig. 10, is an enlarged vertical section taken on the line X—X of Fig. 4. Fig. 11, is an enlarged vertical section taken on the dotted line XI of Fig. 4. Fig. 12, is a vertical section taken on the line XII—XII of Fig. 13. Fig. 13, is a horizontal section on the line XIII—XIII of Fig. 12. Fig. 14, is a rear view of the machine parts broken away and other parts in the background omitted. Fig. 15, is a top plan view of a modified form of needle-actuating mechanism. Fig. 16, is a side view of the same. Fig. 17, is a side view of a modified form of mechanism for operating the feed plunger. Fig. 18, is an enlarged side view of a portion of machine with the baling case extension omitted. Fig. 19, is a horizontal section taken on the line XIII—XIII of Fig. 12 and similar to Fig. 13 except that it shows only the left-hand side of the baling case and a part of the extension. Fig. 20, is an enlarged vertical section taken on line XX—XX of Fig. 3, and Fig. 21, is a sectional perspective view showing the connection between the cut-off plate and one of the guide bars therefor. Fig. 22, is a detail side view of the needle-carrying frame, the endless drive chain and the link connecting the chain and needle-carrying frame.

In the said drawings, 1 indicates a threshing machine of any suitable or preferred type, 2 the rear axle thereof and 3 the wheels upon said axle.

4 indicates a standard secured to and rising from the right-hand end of the axle and bolted to the outermost of a pair of inclined bars 5, preferably of wood and secured at their upper ends to the channel iron 6, secured to the top of the threshing machine, and at their lower ends to the bracket 7 secured in any suitable manner to the lower portion of the box or receptacle 8 forming practically an extension of the rear end of the threshing machine.

9 indicates a series of uprights secured to the outer side of the threshing machine and its extension, and 10 longitudinal bars secured to said uprights, the bar 10 at the right-hand side of the machine being also secured in any suitable manner to the inner side of the innermost inclined bar 5, paralleling the last-named bar 10, and secured at its rear end in any suitable manner in the bar 11.

12 indicates bearing boxes secured to the right hand bar 10, and bar 11, and 13 a shaft journaled therein and equipped with a sprocket wheel 14, adapted to be operated by a driven chain 15, the driving mechanism for the chain being omitted.

16 is a sprocket pinion on shaft 13, connected by a chain 17 with the large sprocket wheel 18, secured on a shaft 19 journaled in the inclined bars 5, and 20 is a small sprocket wheel on the same shaft.

21 is a bar secured at its lower end to the outermost bar 5, and forming a journal at its upper end for a shaft 22, extending clear across the machine and above the same, said shaft being also journaled in bearings 23, on bars 10. 24 is a sprocket wheel secured on said shaft, and 25, a sprocket wheel journaled on a shaft 26 extending through the threshing machine and journaled in a bearing 27, secured to the innermost bar 5 and in bearings 27ᵃ secured to the contiguous bars 9 at opposite sides of the machine, a sprocket chain 28 engaging wheels 20, 24 and 25.

29 is a sprocket wheel secured on shaft 22, in the vertical plane of the outermost bar 5, and 30 is a chain connecting said sprocket wheel with a sprocket wheel 31, journaled on a short shaft 32, journaled in a frame 33, secured rigidly to and projecting from the outermost bar 5, the inner end of said shaft being equipped with a rigid crank 34, for a purpose hereinafter explained.

35 is a bar keyed on shaft 32, outward of wheel 31, and 36 a spring catch secured to the rear end of frame 33 to prevent back rotation of bar 35. Pivoted as at 37 at the inner side of bar 35 is a catch consisting of an arm 38, an arm 39 projecting at right angles to arm 38, and an arm 40 projecting from the outer end of arm 39 in the opposite direction to arm 38, said arm 40 being adapted to strike bar 35 to limit the pivotal movement of the catch in one direction. Depending from arm 40 is a pin 41 engaging one end of an expansive coil spring 42 secured at its opposite end on and bearing against a boss 43 projecting from bar 35, the tendency of spring 42 being to push the catch to the position shown in dotted lines Fig. 8, the movement of the catch being limited by means of the overhanging angle arm 44 carried by bar 35. Pivoted as at 45 to the frame 33 is a stop 46, having a comparative long arm 47 whose weight is adapted to swing the stop from the position shown in dotted lines to the position shown in full lines Fig. 8, a stop pin 48 projecting from frame 33 limiting the gravitative movement imparted to the pivoted stop by its arm.

49 is a rigid arm projecting outwardly from frame 33, and 50 a lever pivotally mounted on the outer end of said arm and having its inner end underlying arm 47 and pressed yieldingly against the same by spring 51 attached to frame 33, so as to hold the pivoted catch, when not overcome by the pressure thereon of the spring-actuated catch carried by bar 35, in the position shown by dotted lines Fig. 8.

52 is an arm depending from said lever to form a support for the lower end of bar 53; secured at its upper end to the lever and in practice forming a rigid part of the same, the lower end of said lever extension or bar 53 having a laterally projecting flange 54 in the path of the pin 55 projecting from one side of the toothed wheel 56 journaled on an angle bracket 57 secured to the extension 58 of the baling case hereinafter described, said wheel projecting down through a slot 59 in said extension so as to frictionally engage and be rotated by the baling material forced as hereinafter explained, through the baling case extension.

In practice wheel 31 is revolving continuously in the direction indicated by the arrows Figs. 1 and 8, and wheel 56 moves intermittently in the direction indicated by the arrows Figs. 1, 7 and 8, so that once in each revolution its pin 55 engages flange 54 and swings lever 50 down to the position shown in dotted lines Fig. 7, said lever springing up under the retractile power of spring 51 the instant pin 55 releases flange 54, and striking arm 47 of the pivoted stop 46 so as to throw said stop to the position shown in dotted lines Fig. 8, said stop being secured in such position by the instant depression of the catch arm 38, said catch being turned to the position shown in dotted lines by the expansive power of spring 42. Shortly after the catch is thus depressed, the lug 60 of wheel 31, strikes the upper end of arm 39 of the catch and as a result the bar 35 carrying said catch is rotated with the wheel. The shaft 32 is also revolved because the bar is keyed upon it, the revolution of the shaft imparting like movement to the crank arm 34 and thereby advancing and withdrawing the needles hereinafter described. Immediately after said bar 35 began to revolve stop 46 was restored through its arm 47 to its original position as shown in full lines Fig. 8, this action being permitted because the retractile spring 51 is gaged to hold the lever 50 at about the height indicated in full lines Figs. 7 and 8. Now as the revolution of bar 35 is completed the catch arm 38 strikes the pivoted stop as shown in full lines Fig. 8, and is swung pivotally back until it is out of the path of the wheel lug 60, the engagement of arm 40 of the catch with the top of the bar arresting the movement of the latter, catch 36 snapping under the opposite end of the bar at the same instant so as to prevent any accidental back rotation and thereby hold the bar with its pivoted catch in proper relation for the repetition of the action described when wheel 56 completes a second revolution. It will thus be understood that the needles are operated once in each revolution of wheel 56 and that consequently the circumference of said wheel determines the length of the bale.

61 indicates an arm secured rigidly on shaft 19, outward of sprocket wheel 18, the outer end of such arm being secured on the outer end of a pin 62, projecting from wheel 18, and journaled on said pin between said wheel and arm 61, is a boxing 63 attached to one end of a cable 64, which is guided between the grooved pulleys 65 journaled in the frame 66 secured to the outermost bar 5, and from said pulleys the cable extends through casting 7 and under the angularly disposed grooved pulley 67 journaled in said casting. From pulley 67 the cable extends below the walls $8^c$ hereinafter referred to, and is attached to a bracket 68 clamped upon the arm hereinafter described, of the baling plunger 69, arranged to operate in the curved baling case 70, and the extension 58 thereof, said baling case extending transversely and at the bottom of the box or receptacle at the front ends of walls $8^m$ thereof. $8^a$ indicates the top, $8^b$ the back wall, and $8^c$ the side walls of the upper portion of the box or receptacle. $8^d$ are plates closely underlying said side walls and secured to the same by angle irons $8^e$, there being a pair of angle irons $8^e$ at each side which terminate at opposite sides of the baling case extension 58. $8^f$ are spacing plates between the ends of the angle irons $8^e$ and secured upon plates $8^d$, and $8^g$ are angle irons secured upon the spacing plates and disposed opposite to the angle irons $8^e$ so that the vertical arms of angle irons $8^g$ may be bolted to similar but oppositely disposed angle irons $8^h$ secured to the upper corner angle irons $8^i$ of the baling case extension, the top wall $8^j$ of said baling case extension being secured to angle irons $8^i$ at the underside of their horizontal arms and therefore in horizontal alinement with the plates $8^d$. The lower angle irons $8^k$ are secured in any suitable manner to the bars $8^L$ paralleling plates $8^d$ and connected to said plates by plates $8^m$ forming the side walls of the lower portion of the box or receptacle, that is forming the side walls of the feed chamber for the baling case hereinafter described, $8^n$ and $8^o$ indicating angle irons securing walls $8^m$ to plates $8^d$ and bars $8^L$ respectively. The front ends of bars $8^L$ are secured in any suitable manner to the cross timber $8^p$ of the threshing machine or to an equivalent support, that portion of the right-hand bar $8^L$ between the baling case extension and chamber $8^p$ forming a rest for the lower skeleton portion $7^a$ of the casting 7 hereinbefore described, said casting also having a laterally projecting arm $7^a$ secured to the forward right hand angle iron $8^e$.

Secured to the inner sides of the walls $8^c$ are guard plates $8^q$ to deflect the straw from the thresher into the feed chamber hereinbefore described, the bottom of said feed chamber consisting of a plate $8^r$ underlying the side walls $8^m$ and resting on bars $8^L$, and secured to the walls $8^m$ by angle irons $8^o$; said bottom extending from the rear ends of walls $8^m$ to a point about vertically below the rear ends of the front angle irons $8^e$ so as to form the bottom of the curved baling case 70 hereinbefore referred to.

71 is a bracket secured on axle 2 of the threshing machine, and 72 is a pivot bolt disposed concentrically of the baling case and forming the axis of motion of the arm of the plunger, said arm being constructed as follows:—
73 is a pair of parallel plates separated by the washer 74 on bolt 72, and extending by preference through a slot 75 in the axle 2. 76 is an I-beam having its web portion fitting and secured between plates 73 and also secured to and between arms 77 of the plunger 69.

The front or inner side of the baling case consists of the curved angle plates 78—79, 80—81, the first-named pair forming the upper and lower corners of the baling case. The ends of the angle plates 78 are provided with openings 78$^a$ through which plates 8$^d$ extend underlying the horizontal arm of said angle plate and being secured rigidly to said plate in any suitable manner. The ends of the angle plates 79 rest on and are secured to bars 8$^L$, the horizontal arm of angle iron 79 occupying the same horizontal plane as the bottom plate 8$^r$ and fitting snugly against the front end of the same. The angle plates 80 and 81 are disposed with their substantially horizontal arms projecting forward or in the opposite direction to the arms of the corner angle plates 78, 79, and connecting the upper angle plates 78 and 80 and the lower angle plates 79 and 81 together in pairs at the inner side of their vertical portions are plates 81$^a$ which form the front wall of the baling case, the space between said plates providing a substantially horizontal slot in which the plunger arm operates. At the right hand side of the machine, the angle plates 80 and 81 project a slight distance and are riveted or otherwise secured to the front or inner side wall 81$^b$ of the baling case extension.
The opposite end of said angle plates 80 and 81 project beyond the opposite side of the box or receptacle without change of curvature and plate 81 is bolted to the bar 82. The upper plate carries rigidly an angle plate 83, connected by the brace bar 84 to bar 82, a brace 85 secured to the contiguous upright 9, is provided at its lower end with an arm 86 carrying a bolt 87, extending through bar 82, and forming a journal for sheave 88. A bolt 89 extends through angle plate 83, bar 84, and the brace 85, and journaled upon said bolt between said brace and bolt 87 is a sheave 90, having its lower portion in about the same horizontal plane as the plunger arm and its outer portion in about the same vertical plane as the rear portion of sheave 88.

91 indicates a bar paralleling and occupying the same horizontal plane as the substantially horizontal arm of the angle plate 78 and having its ends resting and secured upon the plates 8$^d$.

92 indicates a pair of bars fitting against the inner edges of plates 8$^d$, and underlying bar 91 and the upper arm of the angle plate 78 and extending through slots 93 of the latter. Rearward of bar 91, bars 92 are bent upward as at 94, and outward so as to provide rear portions 95, resting upon plates 8$^d$.

96 is a curved cut-off plate which at times forms the top of the baling case and at such times fits snugly against the under sides of the upper arm of angle plate 78 and bar 91, the ends of said plate being secured rigidly to bars 92, so as to move therewith as hereinafter explained. The portions 95 of said bars 92 project beyond the rear end of the receptacle and are then bent upward and rearward as at 97, and are connected at their rear ends to the cross bar 98, connected by chains 99 with the lower ends of springs 100 secured at their upper ends to arms 101 carried by swing arms 102 pivotally suspended from a cross rod 103, journaled in the rear ends of bars 10, said swing arms being normally held in the position shown in Fig. 3, by retractile springs 104, secured at their rear ends to the swing arms and at their front ends to braces 105 or other fixed points of the machine.

106 is a transverse shaft journaled on the rear end of the extension and provided with beveled catch arms 107, normally engaging cross bar 98. Shaft 106 is also provided with the depending angle arm 108, which projects into the path of rearward movement of the feed plunger, said feed plunger comprising a segment shaped front plate 109, and a top plate 110 united by an angle iron 111 to plate 110, occupying such a position that when the feed plunger moves inward, it strikes the rear edge of the cut-off plate 96, and forces the same forward until it occupies the position shown in Fig. 6, where it will be noticed it forms the top wall of the baling case. In said figure it will also be noticed that the lower portion of bars 92 project forward of the baling case some distance to coöperate with the cleats 8$^q$ overhanging the rear portion of said bar in compelling the cut-off plate 96 to reciprocate in a direct line.

112 is a shaft journaled in bearings 113, mounted upon the rear end of the top plate of the feed plunger, and secured at their rear ends on the ends of said shaft are a pair of parallel bars 114 equipped with rollers 115 at their front ends engaged once in each revolution by the crank arms 116, mounted on the ends of shaft 26, said crank arms being provided with tread portions 117, concentric of their axes, for a purpose which hereinafter appears.

The front ends of the swing bars 114 are pivotally connected to the lower ends of swinging links 118 mounted as at 119 on the sides of the threshing machine. 120 indicates brackets secured to the sides of the threshing machine and pivoted on said brackets are catches 121 having shoulders 122 held by pressure of springs 123 under the bars 114, the upper ends of the catches being beveled downward and outward as at 124 so that as the crank arms 116 descend they strike said beveled surfaces 124 and force the catches inwardly until their shoulders 122 are withdrawn from under the bars 114. (See Figs. 3 and 20.)

In the practical operation of the machine as said crank arms 116 revolve in the direction indicated by the arrow Fig. 3, they first trip said catches as explained and then come into engagement with the rollers 115, this downward pressure on said rollers causing bars 114 to move rapidly to the rear. During this rearward movement of the feed-plunger, the straw discharged from the threshing machine into the box or receptacle falls down into the feed or condensing chamber between the baling case and the withdrawing feed plunger. In this withdrawing movement of the feed plunger, springs 100 move rearward with swing arms 102 until chains 99 are drawn taut and prevent the lower ends of said springs from moving further. As a result the swing arms 102 continue to move rearward until their lower ends are about in contact with the lower ends of the springs. As this relation is established, the feed plunger has almost completed its withdrawal movement and strikes and operates arm 108, as indicated by arrow Fig. 3, so as to rock shaft 106 and trip catches 107 from engagement with bar 98. As this occurs the springs 100 held by the tension of the chains against arms 102, spring rearwardly and slide cut-off plate 96 rearward until it is arrested by lugs 92ᵃ depending from the front ends of bars 92, striking the front side of the angle plate 78 so that plate 96 shall largely cut off the supply of material.

At the moment the feed plunger is withdrawn its full distance as indicated by dotted lines Fig. 3, the tread portions 117 of crank arms 116 are in engagement with rollers 115, so as to hold the feed plunger withdrawn and give time for the charge of straw which lodged upon the feed plunger when advanced, to fall into the chamber. As said tread portions pass out of engagement with rollers 115 in the continued movement of the crank arms 116, the overcoming pressure is removed from springs 104, and they move the feed plunger forward so as to force the charge of straw into the feed or condensing chamber and below the cut-off plate through the open rear side of and into the baling case, the cut-off plate being at the same time forced inwardly by said feed plunger so as to form the top wall of the baling case. The feed plunger and cut off plate remain in such advanced position with the former forming the back wall of the baling case, until the crank arms 116 have made about two-thirds of a revolution and have again come into engagement with rollers 115, during which time the charge of straw in the baling case has been acted upon by the baling plunger as hereinafter explained.

125 indicates an eye-bolt pivoted to the opposite end of clamp 68 from cable 64, and 126 a cable connected to said eye-bolt at one end and guided under sheave 90 and over sheave 88, extending upwardly from the latter. The upper end of said cable is attached to a link 127 pivoted to the end of an arm 128 journaled on shaft 22.

129 is a plate secured rigidly on shaft 22 and provided with a pair of outwardly projecting lugs 130 and 131, connected at the outer side of arm 128 by bar 132, the opposite ends of said bar being prolonged as at 133 and 134 and connected respectively by springs 135 and 136 to arm 128, the last-named spring being preferably the weaker of the two.

In the practical operation of the machine, when the baling or compression plunger is in the position shown in full lines Fig. 4, arms 61 and 128 occupy substantially the relative positions shown in Figs. 1 and 3, the first-named arm rotating in the direction indicated by the arrow a Fig. 3, and the other arm in the direction indicated by the arrow b same figure. As the distance between the ends of arms 128 and 61 measured by way of the cables, is shortest when said arms occupy the positions shown, or the reverse position with arm 128 projecting upward in alinement with cable 126 and arm 61 downward and rearward in alinement with cable 64, it follows that when said arms stand at right angles to the positions referred to, the distance is greater between the ends of the arms than at any other time. To compensate for this variation in the distance between the free ends of said arms I have provided for a relative backward movement of arm 128, said arm having at the proper time an accelerated forward movement so that when a half revolution is completed it shall again stand at the same angle to arm 61 that it originally stood.

In the initial part of the withdrawal action of the plunger, spring 135 which revolves with shaft 22, pulls arm 128 in the direction indicated by the arrow, but in view of the fact that the distance between the ends of the arms measured by way of the cables increases until said arms have made about one-fourth revolution and the cable connection is non-elastic, said spring 135 is gradually stretched to permit of the relative back movement of arm 128 with respect to arm 61, so that by the time the outer end of arm 61 has reached the point c, the outer end of arm 128 has not yet attained the diametrically opposite point b. By the time the arm 61 has reached point c, lug 131, moving at the same speed as arm 61 has caught up with and is pressing against the rear edge of arm 128. Now as the rotation continues said lug revolves arm 128 at the same speed as arm 61 until after the first-named arm passes point d, when the distance between the ends of said arms begins to decrease. As a result the retractile power of spring 135 is exerted to move arm 128 at a greater speed than arm 61, that is at a speed as much in excess of that of arm 61 as it fell below the speed of the latter in the first quarter revolution. As a result, by the time arm 61 attains a position in the plane occupied by arm 128, in full lines Fig. 3, and has therefore made half a complete revolution, arm 128 is projecting diametrically opposite to the position in Fig. 3, and has also made half a complete revolution and is again disposed about half way between lugs 130 and 131. By the time the arms have completed the first half revolution, as explained, the baling plunger has completely withdrawn to permit the feed plunger to force the straw from the feed or condensing chamber into the baling case in advance of the baling plunger. In the second half revolution of said arms the relative movements are repeated to make the power stroke of the baling plunger, that is to say as arm 61 travels upwardly toward its original position as shown in Fig. 1, it causes said plunger to force the straw through the baling case and into the extension thereof, arm 128 in this power stroke initially having a relative greater forward movement until it engages lug 130, and then losing the ground gained as it makes its last one-fourth revolution, so that at the end of the revolution the baling plunger and arm 128 return to approximately the positions shown in full lines Figs. 1 and 3.

137 indicates a spring roller of any suitable type supported in the plane of the rear side of the baling case externally of the box or receptacle and at the side thereof opposite from the baling case extension. 138 indicates a flexible apron upon said roller and attached thereto at one end and at its opposite end to the rear face of the baling plunger, the arrangement being such that when the baling plunger makes its compression stroke it unwinds said apron so that the latter shall close the rear side of the baling case and prevent any loose straw from entering the latter back of the plunger. Upon the return stroke of said plunger the spring roller rewinds upon it said apron. As aprons of this type have been disclosed in prior patents it has not been elaborately shown and described.

Referring now to the wire-holding reels and the mechanism for placing the wire around each bale, 139 indicates a horizontally arranged U-shaped frame having its front or bridge portion secured rigidly in any suitable manner to the rear sides of angle-plates 80 and 81 contiguous to roller 137. 140 indicate cross bars secured to the inner sides of the superposed arms of the U-shaped frame and connecting the ends of said cross bars are upright bars 141. Lying between and substantially parallel with and near the arms of the U-shaped frame and pivoted at their rear ends as at 142 to uprights 141 are substantially U-shaped levers 143 held by expansive springs 144 pressed yieldingly toward the contiguous arms of the U-shaped frame, so that the brake shoes 145 pivotally carried by the levers at the opposite sides of the U-shaped frame shall firmly engage the wire-carrying reels 146 journaled at the upper and lower sides of said U-shaped frame, the wires 146$^a$ from said reels, extending transversely across the machine and engaging the front sides of the rollers 147 journaled in brackets 148 and 149 secured to the angle plates 78 and 79 and 80 and 81, respectively, said rollers being of concave or double-cone form and disposed contiguous to the baling case extension, as shown most clearly in Fig. 4, their construction and means of support showing most clearly in Fig. 10. From said rollers the wires extend into the extension contiguous to its point of connection with the baling case, and holding the wires 146$^a$ depressed with a yielding pressure are bars 149$^a$ pivoted to brackets 149$^b$ carried by angle plates 78 and 81, the front ends of said pivoted bars having laterally projecting arms 149$^c$ adapted to be engaged by the beveled surfaces of the needles hereinafter described in order that the latter in their forward movement shall cause said bars 149$^a$ to depress the wires 146$^a$ in a horizontal plane and rearward of the grooved rollers, hereinafter described, of the needles (see Fig. 10). Initially or at the beginning of the baling operation the wires are brought transversely through the extension and project rearward of the same through the spaces between the rear pair of angle irons 8$^i$ forming the corners of the baling case extension. The outer ends of the angle irons 150 are secured to the clamping mechanism 151 for contracting the discharge end of the baling case extension, which mechanism as it is of common construction need not be described further than to say that by the revolution of the wheel 152 in one direction or the other the discharge end of the baling case extension is contracted or expanded. Secured to the inner ends of the angle irons 8$^i$ and to and between the angle irons 150, in any suitable manner are the usual or any preferred type of spring retainers 153, these retainers being for the purpose of yielding under the advance of the baling material and the baling plunger and then snapping back into the baling case as the plunger is withdrawn, to limit the expansive movement of the charge of material previously compressed by said plunger.

154 indicate bars connected by a plate 155 extending radially of the axis of the baling plunger and projecting rearwardly from the box or receptacle and baling case extension at the inner end of the latter, and mounted slidingly on and between bars 154, hereinafter referred to in conjunction with plate 155 as a needle guide frame, is a sliding block 156 provided with forwardly projecting arms 157 equipped at their front ends with needles 158, the needles being beveled downward and forward and having their rear portions horizontally bifurcated as at 159, and equipped with grooved rollers 160, the plane of the bifurcations being approximately the same as the wires where they extend outwardly from the guide rollers 147. Pivoted at its lower end on bolt 161 projecting outward from the sliding block 156, is a long lever 162, having its upper end pivoted as at 163 on the outer end of a rod 164, secured in the upper end of a frame 165 projecting upward from the rear end of the box or receptacle and also secured to insure rigidity, to the bracket 166, secured to the upper side of said box or receptacle. 167 indicates a link pivoted at its front end to crank arm 34 on shaft 32, see Fig. 7, and at its rear end to lever 162 as at 168, so that as shaft 32 revolves the lever will be swung forward to pick up the wires and rearward to draw said wires rearwardly through the baling-case extension for the purpose as hereinafter more particularly referred to, of drawing the wires simultaneously across the rear end of a bale and against the front end of the bale next formed.

169 indicates a cam keyed on shaft 32 between frame 33 and crank arm 34, and 170 an arm pivoted as at 171 to frame 33 and resting upon said cam, the opposite end of said arm being connected by a cable 172 which extends downward and under a guide sheave 173 secured to the upper side of the baling case extension, and extends from said sheave transversely through the box or receptacle above the plunger beam arm and is attached at its opposite end to the front end of a lever 174 pivoted as at 175 to one of the bars 140. Secured to the lever near its front end is a short cable 176 terminating in branch cables 177 and 178 extending respectively under and over and engaging the grooved pulleys 179 secured to the inner side of the bridge portion of the U-shaped frame 139, said cables then extending respectively upward and downward and being attached to the bridge portions of the substantially U-shaped levers 143. By virtue of the construction described it will be seen that the arm 170 is lifted by the cam once in each revolution of the shaft 32, which operates lever 174 through the medium of cable 172, and pulls the levers 143 toward each other so as to withdraw their brake shoes 145 out of engagement with the reels 146, this result being accomplished just before each power stroke is completed, the pivoted arm 170 through the force of gravity and springs 144 dropping down to its original position as such stroke is completed, that said springs 144 may effect the reapplication of the brake shoes on the reels and thus arrest the same and thereby prevent an undue amount of wire being fed from the reels.

In the practical operation of the machine shaft 13 is revolved from any suitable power, self-contained with respect to the threshing machine or not as desired, so as to operate chain 17 in the direction indicated by the arrow Fig. 1, the other wheels being driven through the gearing shown in the direction indicated by contiguous arrows in the various figures. Initially the baling plunger is at the opposite end of the baling case from that which it occupies in Fig. 4, and arms 61 and 128 respectively, extending downward and rearward and upward and forward or in other words in the opposite positions from those shown by full lines Figs. 1 and 3.

Now as the baling plunger makes its power stroke, the feed plunger occupies its advanced position as shown in Fig. 4, to constitute the rear wall of the baling case so that the straw in the baling case may be forced therethrough by the baling plunger and into the extension and against the wires extending transversely through the same to the rear, and during this power stroke the straw from the threshing machine is accumulating upon the upper side of the feed-plunger, it being understood of course that the apron 138 has been drawn through the baling case by the baling plunger in front of the feed plunger. Immediately the baling plunger attains the position shown approximately in Fig. 4, crank arms 116 come into engagement with rollers 115 so as to effect the withdrawal of the feed plunger by the time said crank arms attain the positions shown by dotted lines Fig. 3. During the major part of the withdrawal action of the feed plunger the accumulated straw thereon falls into the feed or condensing chamber in advance of the feed plunger and just before such withdrawal action is completed the cut off plate is tripped in a manner hereinbefore described, so as to permit its springs 100 to spring rearward and draw the cut-off plate rearward until it cuts off the supply of straw from the thresher to the feed chamber, such charge of straw thereafter accumulating upon the cut-off plate. Shortly after the withdrawal action of the feed plunger began it was followed by the withdrawal movement of the baling plunger, the movement of the latter continuing sometime after that of the former was completed. Just before the withdrawal movement of the baling plunger ends arms 116 release rollers 115, and as the result the springs 104 advance the feed plunger so that it shall force the straw in front of it into the baling case in advance of the plunger thereof, the feed plunger at the same time forcing the cut-off plate back to its original position so as to form the top wall of the baling case, the second power stroke of the baling plunger then taking place as before, as will be readily understood.

As the successive charges of straw are forced into the baling case extension they force the wires, extending transversely in front of the first charge, against the inner side of the front wall of the extension so that the frictional pressure exerted on the wires by the compressed straw will feed the wires from the reels, it being understood that at this time the brakes are released as hereinbefore explained. As the compressed straw is forced through the baling case extension it comes into frictional engagement with the toothed wheel 56 and rotates the same partially with each stroke of the baling plunger.

The completion of the revolution of the wheel 56 determines the length of the bale and as such revolution is completed pin 55 engages the flange 54 of lever 50 and operates said lever and the parts connected therewith as hereinbefore explained so as to revolve crank arm 34 and cause it in its first half revolution through the connections described, to push the needles forward through the baling case at its junction with the extension, until their beveled ends have engaged and raised the wires extending under tension from rollers 147 along the side of the bale to its front end. As the needles pass, said wires spring or snap downward and engage the rear sides of sheaves 160. As this action takes place the movement of the needles is reversed and in withdrawing to their original positions they draw the wires rearwardly through the baling case at the rear end of the bale, so that at this time the wires extend around the front side and two ends of the bale, the wire in this action of the needles feeding from the reels because at this movement the pivoted arm 170 is raised by cam 169 to withdraw the brakes from the reels.

Immediately the needles attain their original positions the cam permits arm 170 to drop to its original position and springs 144 to reapply the brakes on the reels so that there will be no momentum of the latter to feed unnecessary wire. The next stroke of the baling plunger drives the charge of straw against the doubled strands of wire extending from reels 147 and the rear end of the practically completed bale to the needles, the retainers in conjunction with the rearward backward pressure of the completed bale holding said wires so tightly between said bale and the first charge of the one in process of formation that the wires cannot slip. As a result the operator can cut the wires at a point contiguous to the needles and then draw the ends of the severed portion around the rear side of the bale and secure them together in the usual or any preferred manner.

In Fig. 17, which illustrates a modified construction of the feed plunger actuating means, namely a construction whereby the feed plunger has unyielding movement in both directions, 180 are cams eccentrically mounted on the ends of shaft 26 in place of crank arms 116, and formed with elliptical grooves 181, each having a portion 182, concentric of shaft 26. 183 are swinging links pivotally suspended from bars 10, and provided with pins 184 engaging said grooves, the lower ends of the swinging links being pivoted as at 185 to the feed plunger arms 114. With this construction, with the long axis of the ellipse at right angles to a plane intersecting shaft 26 and the center of the concentric grooved portions 182, the feed plunger is practically stationary when totally withdrawn and is entirely so during the period when the grooved portions 182 are in engagement with pins 184. With these cams it will be apparent that the positive application of power is applied to the feed plunger in its advance stroke as well as its withdrawal stroke as distinguished from the construction previously described wherein the advance of the plunger is effected by the retractive action of springs 104.

In Figs. 15 and 16 which illustrate a modification of the power transmission from shaft 32 to the needles, 186 indicates a sprocket wheel secured on shaft 32 as a substitute for the crank arm 34. 187 is a chain connecting sprocket wheel 186 with the sprocket wheel 188 journaled on a bracket supported shaft 189, and provided with a bevel gear 190 meshing with a bevel gear 191 on the shaft 192 journaled in brackets 193 projecting from the needle-carrying frame, a bevel gear 194 on the opposite end of shaft 192 meshing with a bevel gear 195 secured on a shaft 196 carrying a sprocket wheel 197, said sprocket wheel being connected by a chain 198 with the idler sprocket 199 journaled on and near the front end of the needle-carrying frame. The chain 198 has one of its links provided with an outwardly projecting lug 199 connected pivotally by a link 200 with a cross bar 201, of the needle-carrying frame. In practice assuming that the travel of the chain is in the direction indicated by the arrow Fig. 22, it will be seen that the needles are advanced by a pull exerted by the chain on link 200 and are withdrawn by a pushing action exerted by said link, the continuous movement of the chain in one direction thus imparting a reciprocatory movement to the needles.

From the above description it will be apparent that I have produced a baling attachment for threshing machines embodying the features of advantage enumerated as desirable and which obviously is susceptible of modification in its form, proportion, detail construction and arrangement of the parts without departing from the principle of construction involved.

Having thus described the invention what I claim as new and desire to secure by Letters-Patent, is:—

1. In a machine of the character described, a casing, a baling case therein, a plunger in said case, a rotating arm, a flexible connection between the same and the plunger, a second rotating arm, a flexible connection between the same and the plunger, and means whereby the second arm shall be caused to move at varying speeds during its revolution.

2. In a machine of the character described, a casing, a baling case therein, a plunger in the case, a rotating arm, a flexible connection between the same and the plunger, a rotating plate having lugs, an arm journaled coincidently with said plate and disposed between its lugs, means movable with said plate and pressing said arm toward the lug which is forward with respect to the direction of rotation of the plate, and a flexible connection between said journaled arm and the plunger.

3. In a machine of the character described, a casing, a baling case therein, a plunger in the case, a rotating arm, a flexible connection between the same and the plunger, a rotating plate having lugs, an arm journaled coincidently with said plate and disposed between its lugs, a spring movable with said plate and pressing the journaled arm toward the forward lug, and a flexible connection between said journaled arm and the plunger.

4. In a machine of the character described, a casing, a baling case therein, a plunger in the case, a rotating arm, a flexible connection between the same and the plunger, a rotating plate having lugs, an arm journaled coincidently with said plate and disposed between its lugs, a spring movable with said plate and pressing the journaled arm toward the forward lug, a second spring movable with the plate and tending to press the journaled arm rearward with respect to its direction of rotation, and a flexible connection between the journaled arm and the plunger.

5. In a machine of the character described, a casing, a baling case therein, a plunger in the case, a driven shaft, an arm mounted thereon, a cable suitably guided and forming a connection between the plunger and said arm to transmit movement from the latter to the former in one direction, a shaft driven from the first-named shaft, a plate rigid with the second shaft and provided with lugs, an arm journaled on said second shaft and capable of movement between said lugs, a cable suitably guided and forming a connection between the said journaled arm and the plunger to impart movement to the latter opposite to that imparted to it by the first-named arm, and springs carried by the said plate and exerting pressure in opposite directions on said journaled arm, one of said springs being weaker than the other.

6. In a machine of the character described, a casing, a transversely extending slotted baling case therein, a plunger in the case, an arm carrying the plunger and projecting through the slot of said case, a rotating arm at one side of the casing, a cable suitably guided and forming a connection between said arm and the plunger arm, a rotating plate at the opposite side of the casing from the said rotating arm, an arm rotatable with said plate and having oscillatory movement independent thereof, yielding means tending to hold said arm at the forward extremity of its oscillatory movement during the first quarter of the rotatable movement of said plate and at the rearward extremity of such oscillatory movement during the third quarter of such movement, and a cable suitably guided and forming a connection between said oscillatory arm and the plunger arm.

7. In a machine of the character described, a casing, a baling case therein, a feed plunger therefor and adapted when advanced to form a wall of said case, a swing-frame attached to the plunger, a swing-arm connected to withdraw the plunger from its advanced position, and rotatable means for imparting retrograde movement to said arm.

8. In a machine of the character described, a casing, a baling case therein, a feed plunger therefor and adapted when advanced to form a wall of said case, a swing-frame attached to the plunger, a swing-arm connected to withdraw the plunger from its advanced position, and a rotating arm to impart retrograde movement to said swing-arm and provided with a tread portion to hold said arm withdrawn for a time.

9. In a machine of the character described, a casing, a baling case therein, a feed plunger therefor and adapted when advanced to form a wall of said case, a swing-frame attached to the plunger, a swing-arm connected to withdraw the plunger from its advanced position, a rotating arm to impart retrograde movement to said swing-arm and provided with a tread portion to hold said arm withdrawn for a time, and means to advance the plunger when said tread portion has released said arm.

10. In a machine of the character described, a casing, a baling case therein, a feed plunger therefor and adapted when advanced to form a wall of said case, a swing-frame attached to the plunger, a swing-arm connected to withdraw the plunger from its advanced position, means to support the free end of said swing-arm in a certain position, and means to trip said swing arm from the supporting means and force it rearwardly.

11. In a machine of the character described, a casing, a baling case therein, a feed plunger therefor and adapted when advanced to form a wall of said case, a swing-frame attached to the plunger, a swing-arm connected to withdraw the plunger from its advanced position, means to support the free end of said swing-arm in a certain position, means to trip said swing-arm from the supporting means and force it rearwardly, and guiding means for holding the swing arm in the path of the means which forces it rearward, until the limit of rearward movement of the plunger has been reached.

12. In a machine of the character described, a casing, a baling case therein, a feed plunger therefor and adapted when advanced to form a wall of said case, a swing-frame attached to the plunger, a swing-arm connected to withdraw the plunger from its advanced position, means to support the free end of said swing-arm in a certain position, means to trip said swing-arm from the supporting means and force it rearwardly, guiding means for holding the swing arm in the path of the means which forces it rearward until the limit of rearward movement of the plunger has been reached, and means to readvance the plunger and cause its swing arm to become engaged by the means for holding it in a certain position.

13. In a machine of the character described, a casing, a baling case therein, a feed plunger therefor and adapted when advanced to form a wall of said case, a swing-frame attached to the plunger, a swing-arm connected to withdraw the plunger from its advanced position, an oscillatory arm on the casing and pivoted to said swing-arm, means to hold the swing arm in a certain position when advanced, and rotating means to trip said holding means from said swing arm and then force the latter rearward.

14. In a machine of the character described, a casing, a baling case therein, a feed plunger therefor and adapted when advanced to form a wall of said case, a swing-frame attached to the plunger, a swing-arm connected to withdraw the plunger from its advanced position, an oscillatory arm on the casing and pivoted to said swing-arm, means to hold the swingarm in a certain position when advanced, and rotating means to trip said holding means from said swing-arm and then force the latter rearward, and provided with means to hold said arm at its limit of rearward movement for a time.

15. In a machine of the character described, a casing a baling case therein, a feed plunger therefor and adapted when advanced to form a wall of said case, a swing-frame attached to the plunger, a swing-arm connected to withdraw the plunger from its advanced position, an oscillatory arm on the casing and pivoted to said swing-arm, means to hold the swing-arm in a certain position when advanced, rotating means to trip said holding means from said swing-arm and then force the latter rearward, and means to advance the plunger and said arm when the latter has been released by said holding means.

16. In a machine of the character described, a casing, a baling case, a feed-plunger therefor, a swing-arm connected to impart retrograde movement to the plunger, means for supporting the front portion of said arm to permit it to swing in the arc of a circle, a catch in the path of said arm to support its front end in a certain position, and rotating means to trip said catch and force said arm rearward until its limit of such movement has been attained.

17. In a machine of the character described, a casing, a baling case, a feed plunger therefor, a swing-arm connected to impart retrograde movement to the plunger, means for supporting the front portion of said arm to permit it to swing in the arc of a circle, a catch in the path of said arm to support its front end in a certain position, rotating means to trip said catch and force said arm rearward until its limit of such movement has been attained, and means to restore said catch to its original position after said arm has been moved rearward a sufficient distance.

18. In a machine of the character described, a casing, a baling case, a feed plunger therefor, a swing-arm connected to impart retrograde movement to the plunger, means for supporting the front portion of said arm to permit it to swing in the arc of a circle, a catch in the path of said arm to support its front end in a certain position, rotating means to trip said catch and force said arm rearward until its limit of such movement has been attained, means to restore said catch to its original position after said arm has been moved rearward a sufficient distance, and means to return said arm to its original position and cause it to reëngage said catch.

19. In a machine of the character described, a casing, a baling case therein, a feed-plunger for the case, a cut-off, means for holding the cut-off normally over the baling case, means to withdraw the feed plunger from the baling case, means actuated by the plunger when partly withdrawn to trip the said holding means, spring-actuated means to move the cut-off rearwardly of the baling case when the said holding means is tripped, and means whereby the continued withdrawal of the plunger continues the withdrawal movement of the cut-off.

20. In a machine of the character described, a casing, a baling case therein, a cut-off rearward of the said case, means for holding the cut-off yieldingly in such position, a feed-plunger, means for advancing the plunger and the cut-off, means for automatically locking the cut-off in its advanced position, means for withdrawing the plunger, and means actuated by the withdrawing plunger for tripping the cut-off locking means.

21. In a machine of the character described, a casing, a baling case therein, a cut-off rearward of the said case, means for holding the cut-off yieldingly in such position, a feed-plunger, means for advancing the plunger and the cut-off, a gravity catch for locking the cut-off in its advanced position, and means actuated by the withdrawal action of the plunger for tripping the gravity catch to release the cut-off.

22. In a machine of the character described, a casing, a baling case therein, a plunger movable toward and from the said case, a cut-off, springs to withdraw the cut-off, flexible connections between the springs and cut-off, a catch mechanism holding the cut-off in its advanced position and the springs repressed, and means whereby the withdrawal action of the plunger trips said catch to permit said springs to move the cut-off rearwardly.

23. In a machine of the character described, a casing, a baling case therein, a plunger movable toward and from said case, a cut-off, springs to withdraw the cut-off, flexible connections between the springs and cut-off, a catch mechanism holding the cut-off in its advanced position and the springs repressed, means whereby the withdrawal action of the plunger trips said catch to permit said springs to move the cut-off rearwardly, and means movable with the feed-plunger to engage the springs and continue the rearward movement of the cut-off.

24. In a machine of the character described, a casing, a baling case therein, a cut-off having rearwardly projecting arms, a cross-bar connecting said arms, a rock-shaft having catch arms engaging said bar to hold the cut-off advanced and over the baling case and also having a crank arm, a feed-plunger for the baling case, means to move the same rearward against said crank-arm to rock the shaft and trip the catch-arms from engagement with said bar, means to move the cut-off rearwardly when thus released, and means movable with the plunger for continuing the rearward movement of the cut-off with the continued rearward movement of the plunger.

25. In a machine of the character described, a casing, a baling case therein, a cut-off having rearwardly projecting arms, a cross-bar connecting said arms, a rock-shaft having catch arms engaging said bar to hold the cut-off advanced and over the baling case and also having a crank arm, a feed-plunger for the baling case, means to move the same rearward against said crank-arm to rock the shaft and trip the catch-arms from engagement with said bar, means to move the cut-off rearwardly when thus released, means movable with the plunger for continuing the rearward movement of the cut-off with the continued rearward movement of the plunger, and means for advancing the plunger and cut-off to their original positions.

26. In a machine of the character described, a casing, a baling case carried thereby, a wire carrying reel, a guide for the wire to hold it near one side of the baling case, a reciprocatory needle-carrying frame to pass the needle transversely through the case past the wire, and means engaging and adapted to yield with the wire when the latter is pushed aside by the pressure of the advancing needle and to press the wire into the path of the backward movement of said needle.

27. In a machine of the character described, a casing, a baling case carried thereby, a wire-carrying reel, a guide for holding the wire contiguous to one side of the case, a needle-guide frame at the opposite side of the case and approximately in line with said wire-guide, a reciprocating needle carried by said frame and of forwardly tapering form and horizontally bifurcated and provided with a grooved roller journaled in said bifurcation, and a pivoted bar holding the wire in the horizontal plane of said roller and provided with an arm in the plane of the needle and adapted to be pushed upward by said needle after the latter has passed the wire to cause said bar to press the wire in the plane and rearward of said roller and hold it in such position until the latter in the back reciprocation of the needle has engaged said wire.

28. In a machine of the character described, a casing a baling case carried thereby, a reciprocating plunger in the baling case, a rigid frame, an intermittently rotatable shaft therein, a driven wheel journaled on the shaft, a bar rigid with said shaft, a pivoted spring-actuated catch mounted on said bar, a pivoted stop mounted on said frame and normally engaged by said catch, means actuated by the movement of the baling material in the case for tripping said stop from said catch to permit the latter to move, and a lug mounted on the driven wheel to engage the catch in its new position and impart movement to the bar carrying the same and the shaft to which said bar is secured.

29. In a machine of the character described, a casing, a baling case carried thereby, a reciprocating plunger in the baling case, a rigid frame, an intermittently rotatable shaft therein, a driven wheel journaled on the shaft, a bar rigid with said shaft, a pivoted spring-actuated catch mounted on said bar, a pivoted stop mounted on said frame and normally engaged by said catch, means actuated by the movement of the baling material in the case for tripping said stop from said catch to permit the latter to move, a lug mounted on the driven wheel to engage the catch in its new position and impart movement to the bar carrying the same and the shaft to which said bar is secured, and means to redispose said stop in the path of rotary movement of said catch after the latter has started on its travel.

30. In a machine of the character described, a casing, a baling case carried thereby, a reciprocatory plunger in the baling case, a rigid frame, an intermittently rotatable shaft therein, a driven wheel journaled on the shaft, a bar rigid with said shaft, a pivoted spring-actuated catch mounted on said bar, a pivoted stop mounted on said frame and normally engaged by said catch, means actuated by the movement of the baling material in the case for tripping said stop from said catch to permit the latter to move, a lug on the driven wheel to engage the catch in its new position and impart movement to the bar carrying the same and the shaft to which said bar is secured, means to redispose said stop in the path of rotary movement of said catch after the latter has started on its travel, and means to prevent back rotation of said shaft as it completes each revolution.

31. In a machine of the character described, a casing, a baling case carried thereby, a reciprocating plunger in the baling case, a rigid frame, an intermittently rotatable shaft therein, a driven wheel journaled on the shaft, a bar rigid with said shaft a pivoted spring-actuated catch mounted on said bar, a pivoted stop mounted on said frame and normally engaged by said catch, means actuated by the movement of the baling material in the case for tripping said stop from said catch to permit the latter to move, a lug on the driven wheel to engage the catch in its new position and impart movement to the bar carrying the same and the shaft to which said bar is secured, means to redispose the stop in the path of rotary movement of said catch after the latter has started on its travel, and a spring catch to engage said bar after it has completed a revolution to prevent back movement thereof.

32. In a machine of the character described, a casing, a baling case carried thereby, a reciprocating plunger in the baling case, a rigid frame, an intermittently rotatable shaft therein, a driven wheel journaled on the shaft, a bar rigid with said shaft, a pivoted spring-actuated catch mounted on said bar, a pivoted stop mounted on said frame and normally held yieldingly in the path of said catch, a lever in the path of said stop, means actuated by the movement of the baling material in the case to move said lever away from the stop and then release said lever, and a spring resisting the movement of said lever away from said stop and for causing said lever to spring back in its original position and strike and trip said stop off said notch.

33. In a machine of the character described, a casing, a baling case carried thereby, a reciprocating plunger in the baling case, a rigid frame, an intermittently rotatable shaft therein, a driven wheel journaled on the shaft, a bar rigid with said shaft, a pivoted spring-actuated catch mounted on said bar, a pivoted stop mounted on said frame and normally held yieldingly in the path of said catch, a lever in the path of said stop, a wheel engaging the baling material in the case and rotated intermittently by the movement imparted to said material by the plunger, means whereby said wheel once in each revolution shall operate said lever, and move it away from said stop, and a spring resisting said lever movement and adapted when the latter is released by said wheel to swing the lever back and cause it to trip said stop from the path of said catch.

34. In a machine of the character described, a suitable casing, a baling case therein, a wire carrying reel, from which the wire extends to the front end of the baling material in the case, a plunger for forcing such material through the case, a reciprocatory needle to pass transversely through the case back of the baling material therein and adapted to engage the wire, a rigid frame, a shaft journaled therein, means whereby the rotation of said shaft imparts reciprocatory movement to the needle, a driven wheel journaled on said shaft and provided with a lug, a bar rigid with said shaft, a pivoted catch carried by said bar, a movable stop carried by the frame and engaged by the catch, means actuated by the movement of the baling material for tripping said stop from the path of the catch, and means for disposing the catch in the path of said lug after the stop has been tripped.

35. In a machine of the character described, a suitable casing a baling case therein, a wire-carrying reel, from which the wire extends to the front end of the baling material in the case, a plunger for forcing such material through the case, a reciprocatory needle to pass transversely through the case back of the baling material therein and adapted to engage the wire, a rigid frame a shaft journaled therein, means whereby the rotation of said shaft imparts reciprocatory movement to the needle, a driven wheel journaled on said shaft and provided with a lug, a bar rigid with said shaft, a pivoted catch carried by said bar, a movable stop carried by the frame and engaged by the catch, means actuated by the movement of the baling material for tripping said stop off the catch, means for disposing the catch in the path of said lug after the stop has been tripped, and means to restore the catch to its original position before the rotary movement of the bar carrying the catch has been completed.

36. In a machine of the character described, a suitable casing, a baling case therein, a wire carrying reel from which the wire extends to the front end of the baling material in the case, a plunger for forcing such material through the case, a reciprocatory needle to pass transversely through the case back of the baling material therein and adapted to engage the wire, a reciprocatory block carrying the needle, a lever suitably mounted to impart movement to said block, a rigid frame, a shaft journaled therein and provided with a crank arm, a link pivotally connecting said crank arm and lever, a driven wheel journaled on said shaft and provided with a lug, a bar rigid with said shaft, a pivoted catch carried by said bar, a movable stop carried by the frame and engaged by the catch, means actuated by the movement of the baling material for tripping said stop from the path of the catch, and means for disposing the catch in the path of said lug after the stop has been tripped.

37. In a machine of the character described, the combination of a casing, a baling case carried thereby, a wire carrying reel, a brake yieldingly engaging said reel, a lever connected to release the brake, a frame, a shaft journaled in the frame, a cam on said shaft, a lever engaging said cam, a cable suitably guided and connecting said levers, a needle to engage said wire and connected to the shaft to be reciprocated by each revolution thereof, a plunger for forcing baling material through the case and means actuated periodically by the movement of said baling material to permit said shaft to operate the needle and cause said cam to operate its lever and thereby effect the release of the brake.

38. In a machine of the character described, a suitable frame, reels carried thereby, levers carried by said frame, brake-shoes carried by said levers and held yieldingly in engagement with the reels, a lever and flexible connections suitably guided between the last-named lever and the brake-shoe carrying levers, and means for actuating the lever to withdraw the shoes from engagement with the reels.

39. In a machine of the character described, a substantially U-shaped frame, reels journaled at the upper and lower sides of the same, cross bars carried by said U-frame at one end, standards connecting the cross bars, U-shaped levers pivoted to said standards and provided with brake shoes to engage the reels, a pair of guide sheaves journaled on the U-frame, a lever having a pivotal point fixed with relation to said U-frame, cables engaging said guide sheaves and attached at their opposite ends to said last-named lever and the levers provided with the brake shoes, and means for yieldingly holding the brake shoes out of engagement with the reels.

In testimony whereof I affix my signature, in the presence of two witnesses.

ROBERT C. REDPATH.

Witnesses:
H. C. RODGERS,
G. Y. THORPE.